(12) United States Patent
Chhabra

(10) Patent No.: US 10,203,815 B2
(45) Date of Patent: Feb. 12, 2019

(54) APPLICATION-BASED TOUCH SENSITIVITY

(71) Applicant: Apple Inc., Cupertino, CA (US)

(72) Inventor: Kapil Chhabra, Milpitas, CA (US)

(73) Assignee: Apple Inc., Cupertino, CA (US)

(*) Notice: Subject to any disclaimer, the term of this patent is extended or adjusted under 35 U.S.C. 154(b) by 0 days.

(21) Appl. No.: 13/827,278

(22) Filed: Mar. 14, 2013

(65) Prior Publication Data

US 2014/0267135 A1 Sep. 18, 2014

(51) Int. Cl.
- G06F 3/044 (2006.01)
- G06F 3/041 (2006.01)
- G06F 3/0488 (2013.01)

(52) U.S. Cl.
CPC ............ *G06F 3/044* (2013.01); *G06F 3/0414* (2013.01); *G06F 3/0416* (2013.01); *G06F 3/0418* (2013.01); *G06F 3/04883* (2013.01); G06F 2203/04101 (2013.01)

(58) Field of Classification Search
CPC .... G06F 3/044; G06F 3/04883; G06F 3/0418; G06F 3/0416; G06F 3/0414; G06F 2203/04101
USPC ..................... 345/173–174; 178/18.01–18.07
See application file for complete search history.

(56) References Cited

U.S. PATENT DOCUMENTS

| | | |
|---|---|---|
| 5,483,261 A | 1/1996 | Yasutake |
| 5,488,204 A | 1/1996 | Mead et al. |
| 5,554,828 A | 9/1996 | Primm |
| 5,760,690 A | 6/1998 | French |
| 5,825,352 A | 10/1998 | Bisset et al. |
| 5,835,079 A | 11/1998 | Shieh |
| 5,845,161 A | 12/1998 | Schrock et al. |
| 5,880,411 A | 3/1999 | Gillespie et al. |
| 6,188,391 B1 | 2/2001 | Seely et al. |
| 6,310,610 B1 | 10/2001 | Beaton et al. |
| 6,310,611 B1 | 10/2001 | Caldwell |
| 6,323,846 B1 | 11/2001 | Westerman et al. |
| 6,429,857 B1 | 8/2002 | Masters et al. |
| 6,459,424 B1 | 10/2002 | Resman |
| 6,520,013 B1 | 2/2003 | Wehrenberg |
| 6,690,387 B2 | 2/2004 | Zimmerman et al. |

(Continued)

FOREIGN PATENT DOCUMENTS

| | | |
|---|---|---|
| JP | 2000-163031 A | 6/2000 |
| JP | 2002-342033 A | 11/2002 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Rodney Amadiz
(74) *Attorney, Agent, or Firm* — Morrison & Foerster LLP (57) ABSTRACT

A sensing threshold of a touch sensing surface may be specified based on a user interface context. For example, inadvertent touches may be more likely in a map application that is often used in a car where a user experiences constant jostling. Accordingly, a high sensing threshold can be associated with the map application, and other applications can be associated with a lower sensing threshold.

23 Claims, 6 Drawing Sheets

(56) References Cited

U.S. PATENT DOCUMENTS

| | | |
|---|---|---|
| 7,015,894 B2 | 3/2006 | Morohoshi |
| 7,184,064 B2 | 2/2007 | Zimmerman et al. |
| 7,218,226 B2 | 5/2007 | Wehrenberg |
| 7,663,607 B2 | 2/2010 | Hotelling et al. |
| 8,479,122 B2 | 7/2013 | Hotelling et al. |
| 8,970,475 B2 | 3/2015 | Haggerty |
| 2002/0118177 A1 | 8/2002 | Newton |
| 2004/0090431 A1 | 5/2004 | Kong et al. |
| 2005/0154798 A1 | 7/2005 | Nurmi |
| 2005/0181808 A1 | 8/2005 | Vaudreuil |
| 2005/0212759 A1 | 9/2005 | Marvit et al. |
| 2005/0264589 A1 | 12/2005 | Kimoto et al. |
| 2006/0026521 A1 | 2/2006 | Hotelling et al. |
| 2006/0139807 A1 | 6/2006 | Shimotono et al. |
| 2006/0197753 A1 | 9/2006 | Hotelling |
| 2007/0075965 A1 | 4/2007 | Huppi et al. |
| 2007/0152980 A1 | 7/2007 | Kocienda et al. |
| 2008/0136587 A1 | 6/2008 | Orr |
| 2008/0146301 A1 | 6/2008 | Goggin et al. |
| 2008/0225000 A1 | 9/2008 | Bellwood et al. |
| 2008/0263344 A1 | 10/2008 | Grignani et al. |
| 2008/0316061 A1 | 12/2008 | Goggin et al. |
| 2009/0262074 A1 | 10/2009 | Nasiri et al. |
| 2009/0265671 A1 | 10/2009 | Sachs et al. |
| 2009/0298533 A1 | 12/2009 | Alameh et al. |
| 2010/0148999 A1 | 6/2010 | Casparian et al. |
| 2010/0149130 A1* | 6/2010 | Jung et al. ............... 345/174 |
| 2010/0161522 A1 | 6/2010 | Tirpak et al. |
| 2010/0194692 A1 | 8/2010 | Orr et al. |
| 2011/0032199 A1* | 2/2011 | Seo et al. ............... 345/173 |
| 2011/0063248 A1* | 3/2011 | Yoon ............... G06F 3/0485 345/174 |
| 2013/0021293 A1* | 1/2013 | Nakai ............... 345/174 |
| 2013/0106776 A1* | 5/2013 | Park ............... G06F 3/04883 345/174 |
| 2013/0127757 A1 | 5/2013 | Mann et al. |
| 2014/0049483 A1* | 2/2014 | Kim ............... 345/173 |
| 2014/0078094 A1* | 3/2014 | Yang ............... G06F 3/0418 345/174 |
| 2015/0169131 A1 | 6/2015 | Haggerty et al. |

FOREIGN PATENT DOCUMENTS

| | | |
|---|---|---|
| WO | WO-03/019806 A1 | 3/2003 |
| WO | WO-2005/109879 A2 | 11/2005 |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI ' 92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Final Office Action dated May 2, 2012, for U.S. Appl. No. 12/488,474, filed Jun. 19, 2009, 111 pages.

Final Office Action dated Mar. 1, 2013, for U.S. Appl. No. 12/488,474, filed Jun. 19, 2009, 36 pages.

Final Office Action dated Mar. 21, 2014, for U.S. Appl. No. 12/488,474, filed Jun. 19, 2009, 28 pages.

Hinckley, K. et al. (2000). "Sensing Techniques for Mobile Interaction," ACM UIST 2000, Symposium on User Interface Software and Technology, CHI Letters 2(2):91-100.

Non-Final Office Action dated Nov. 9, 2011, for U.S. Appl. No. 12/488,474, filed Jun. 19, 2009, 62 pages.

Non-Final Office Action dated Aug. 23, 2012, for U.S. Appl. No. 12/488,474, filed Jun. 19, 2009, 29 pages.

Non-Final Office Action dated Oct. 10, 2013, for U.S. Appl. No. 12/488,474, filed Jun. 19, 2009, 26 pages.

Non-Final Office Action dated Jun. 20, 2014, for U.S. Appl. No. 12/488,474, filed Jun. 19, 2009, 22 pages.

Non-Final Office Action dated Aug. 5, 2015, for U.S. Appl. No. 14/635,850, filed Mar. 2, 2015, 32 pages.

Notice of Allowance dated Oct. 8, 2014, for U.S. Appl. No. 12/488,474, filed Jun. 19, 2009, 11 pages.

Ravi et al. (2006). "Indoor Localization Using Camera Phones," *Proceedings of the Seventh IEEE Workshop on Mobile Computing System & Applications*, pp. 1-7.

* cited by examiner

APPLICATION-BASED TOUCH SENSITIVITY

FIELD OF THE DISCLOSURE

This relates generally to electronic devices with touch sensing capabilities.

BACKGROUND OF THE DISCLOSURE

An electronic device with a touch sensing surface may sense proximity and/or force of a touch object on the surface, depending on the technology used to implement the touch sensing. For example, many resistive touch technologies can sense a force of an object pressing on the touch surface, whereas many capacitive touch technologies can sense proximity of an object on or near the touch surface. Because no force may be required for a touch to be sensed in a capacitive sensing system, such a system may be more susceptible to inadvertent touches.

SUMMARY OF THE DISCLOSURE

A capacitive sensing system can have a sensing threshold for filtering out touches that are not proximate enough to the touch-sensing surface to be considered an intended touch input. By increasing the sensing threshold, a capacitive sensing system can emulate a resistive sensing system, in a sense, by requiring a proximity level so high that some force must be applied to the touch sensing surface to register a touch. In this way, the capacitive sensing system can be less susceptible to inadvertent touches.

Additionally, the sensing threshold may be specified based on a user interface context so that the increased sensitivity possible with capacitive sensing can be used where appropriate, and a decreased sensitivity can be used where inadvertent touches are more likely. For example, inadvertent touches may be more likely in a map application that is often used in a car where a user experiences constant jostling. Accordingly, a high sensing threshold can be associated with the map application, and other applications can be associated with a lower sensing threshold.

DETAILED DESCRIPTION

In the following description of examples, reference is made to the accompanying drawings which form a part hereof, and in which it is shown by way of illustration specific examples that can be practiced. It is to be understood that other examples can be used and structural changes can be made without departing from the scope of the disclosed examples.

An electronic device with a touch sensing surface may sense proximity and/or force of a touch object on the surface, depending on the technology used to implement the touch sensing. For example, many resistive touch technologies can sense a force of an object pressing on the touch surface, whereas many capacitive touch technologies can sense proximity of an object on or near the touch surface. Because no force may be required for a touch to be sensed in a capacitive sensing system, such a system may be more susceptible to inadvertent touches.

A capacitive sensing system can have a sensing threshold for filtering out touches that are not proximate enough to the touch-sensing surface to be considered an intended touch input. By increasing the sensing threshold, a capacitive sensing system can emulate a resistive sensing system, in a sense, by requiring a proximity level so high that some force must be applied to the touch sensing surface to register a touch. In this way, the capacitive sensing system can be less susceptible to inadvertent touches.

Additionally, the sensing threshold may be specified based on a user interface context so that the increased sensitivity possible with capacitive sensing can be used where appropriate, and a decreased sensitivity can be used where inadvertent touches are more likely. For example, inadvertent touches may be more likely in a map application that is often used in a car where a user experiences constant jostling. Accordingly, a high sensing threshold can be associated with the map application, and other applications can be associated with a lower sensing threshold.

Although examples disclosed herein may be described and illustrated herein primarily in terms of capacitive touch sensing and proximity sensing, it should be understood that the examples are not so limited, but are additionally applicable to other touch sensing technologies, including those that sense only force and/or use resistive touch sensing. For example, different force thresholds may be associated with different respective user interface contexts. In other examples, different types of sensing thresholds may be applicable.

Figure 1:
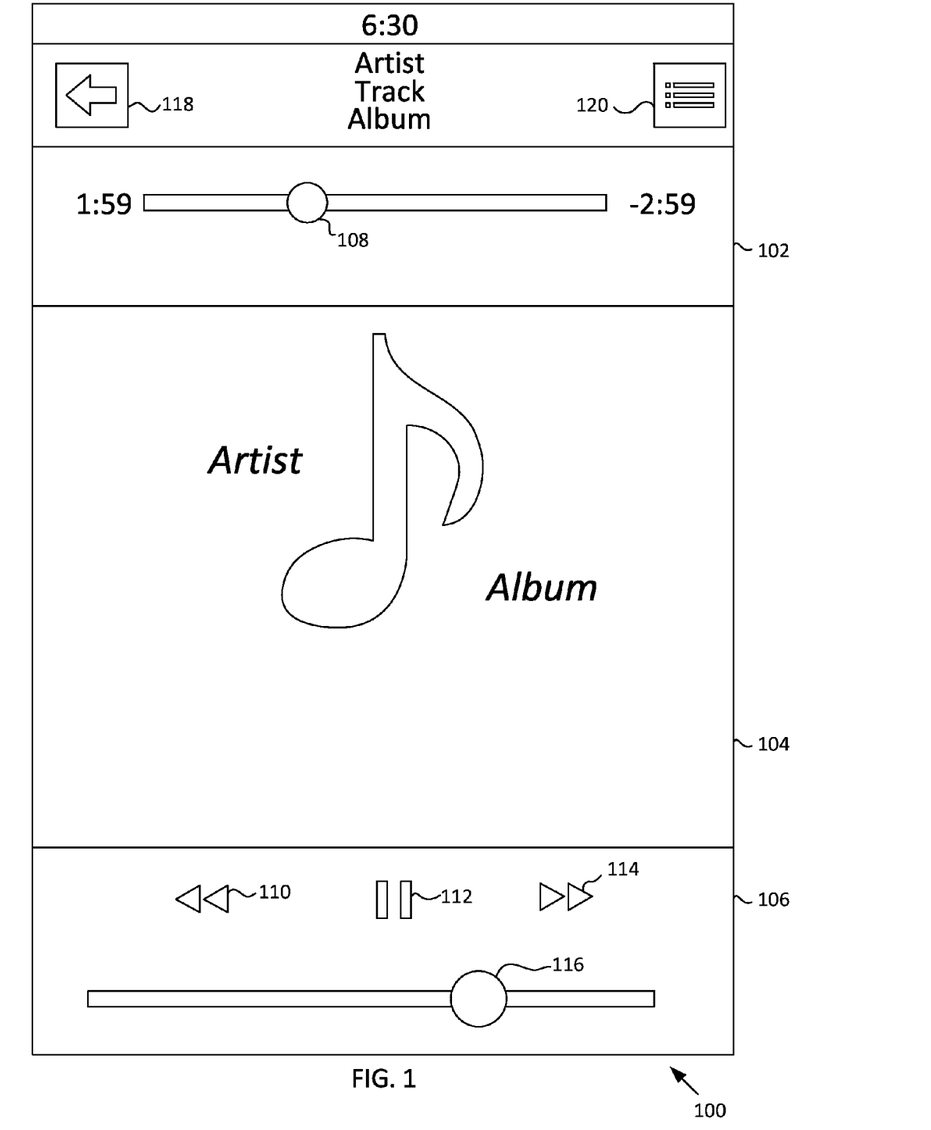
FIG. 1 illustrates an exemplary user interface according to examples of the disclosure.

FIG. 1 illustrates an exemplary user interface (UI) 100 according to examples of the disclosure. In some examples, a sensing threshold may be associated with a UI context. A UI context may include an application, a page of an application, a UI element (panel, button, graphic, icon, etc.), and/or touch input such as a gesture, among other possibilities.

For example, FIG. 1 illustrates a UI 100 of a music application. A sensing threshold may be associated with the music application. In such a case, when the music application is executed, the sensing threshold may be obtained based on its association with the music application, and any touch input on the music application may be processed based on the sensing threshold associated with the music application. In some examples, a different sensing threshold may be associated with different pages in an application. For example, a first sensing threshold may be associated with a "Now Playing" page of a music application, as illustrated in FIG. 1, and a second sensing threshold may be associated with a "Music Library" page of a music application. Any touches received while the "Now Playing" page is displayed may be processed based on the first sensing threshold, whereas any touches received while the "Music Library" page is displayed may be processed based on the second sensing threshold.

A sensing threshold may be associated with a UI element such as a panel. FIG. 1 illustrates a UI 100 including panels 102, 104, and 106. One or more of these panels may be associated with a respective sensing threshold. A first sensing threshold may be associated with panel 102, a second sensing threshold may be associated with panel 104, and a third sensing threshold may be associated with panel 106. Touch input on any part of panel 102, including on slider 108, can be processed based on the first sensing threshold. Touch input on any part of panel 104 can be processed based on the second sensing threshold. Touch input on any part of panel 106, including on buttons 110, 112, and 114 and slider 116, can be processed based on the third sensing threshold.

A sensing threshold may be associated with a UI element such as a button or a slider. FIG. 1 illustrates a UI 100 including buttons 110, 112, 114, 118, and 120 and sliders 108 and 116. In some examples, a different sensing threshold may be associated with each individual UI element. In some examples, sensing thresholds may be associated with categories of UI elements. For example, a first sensing threshold may be associated with every button and a second sensing threshold may be associated with every slider.

A sensing threshold may be associated with certain touch input, such as certain gestures. For example, a first sensing threshold may be associated with a simple tap gesture and a second sensing threshold may be associated with a swipe gesture.

In some examples, a UI context may include combinations of the above examples, and different sensing thresholds may be associated with respective combinations of the above examples. For example, a first sensing threshold may be associated with a swipe gesture on slider 108, a second sensing threshold may be associated with a swipe gesture on slider 116, and a third sensing threshold may be associated with a simple tap gesture anywhere in the music application.

Figure 2:
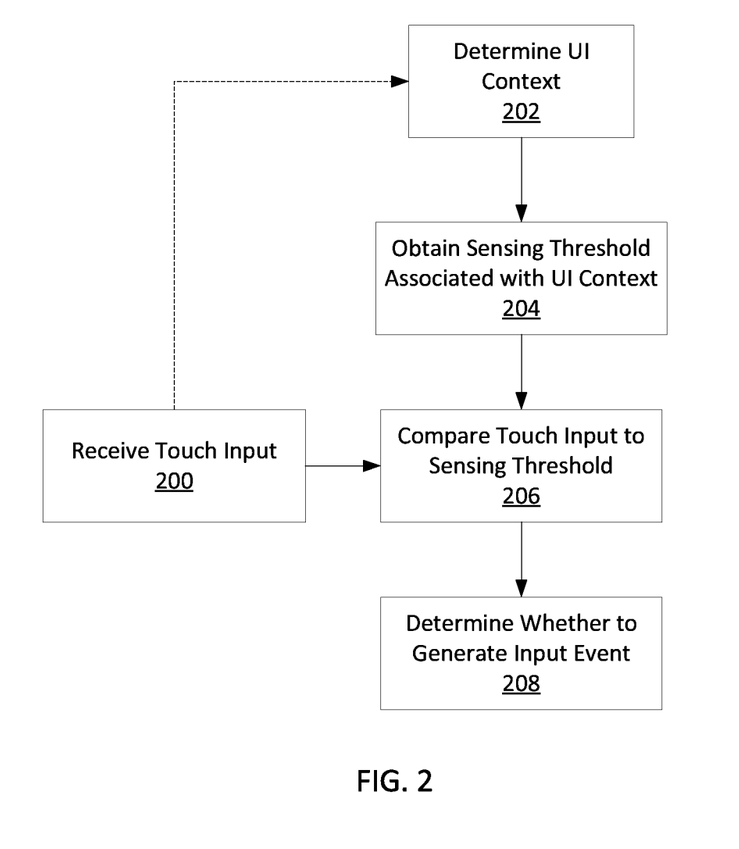
FIG. 2 illustrates an exemplary method of processing touch input according to examples of the disclosure.

FIG. 2 illustrates an exemplary method of processing touch input according to examples of the disclosure. Touch input may be received on or near a touch sensing surface (200). Receiving touch input may include determining some information of the touch input, such as proximity, size, resistance, capacitance, location, shape, and/or speed, among other possibilities.

A UI context may be determined (202). As discussed above, a UI context may include an application, a page of an application, a UI element (panel, button, graphic, icon, etc.), and/or touch input such as a gesture, among other possibilities. In some examples, the UI context may be determined based on the received touch input. For example, a location of the touch input may be determined and the UI context may include one or more UI elements near the location of the touch input. It may be determined that the location of the touch input is within region of the touch sensing surface associated with the one or more UI elements. In another example, the UI context may include the touch input or a gesture of the touch input.

In some examples, the UI context may be determined independent of the received touch input. For example, when an application is executed, the UI context may be determined to be the executed application, independent of the location of any touch input. In another example, when a new page of an application is displayed, the UI context may be determined to be the displayed page of the application.

In some examples, UI context may include information of other sensors such as an accelerometer, a gyroscope, a magnetometer, a barometer, a compass, a proximity sensor, a camera, an ambient light sensor, a thermometer, a GPS sensor, and various system sensors which can sense remaining battery life, power consumption, processor speed, CPU load, and the like. For example, information from an accelerometer or a gyroscope may indicate that a device is being jostled, and a sensing threshold may be increased. Additionally, if information from an accelerometer or gyroscope indicates the device is stationary, the sensing threshold may be decreased.

Additionally, determining a UI context may include determining that a touch input was inadvertent. Based on a determination that a touch input was inadvertent, a sensing threshold may be increased. For example, if a first touch input causes an application to close, and a second touch input immediately re-launches that application, it may be determined that the first touch input was inadvertent. In such a situation, a sensing threshold may be increased to prevent inadvertent touches. Further, a UI context may be associated with a higher or lower sensing threshold based on a determination that a touch input was inadvertent. For example, if inadvertent touches are detected in a map application, then a sensing threshold associated with the maps application may be increased. In another example, if inadvertent touches are detected, then a global sensing threshold may be increased based on the detection of one or more inadvertent touches.

A sensing threshold associated with the UI context may be obtained (204). The sensing threshold associated with the UI context may be obtained from local storage or from a remote device over a wireless or wireline connection. In some examples, a mapping of UI contexts to sensing thresholds may be used to obtain a sensing threshold associated with the UI context. Additionally or alternatively, a sensing threshold may be stored in association with a data structure representing a UI context, and the sensing threshold may be obtained through the data structure. In some examples, the sensing threshold associated with the UI context may be obtained in response to the determination of the UI context. In other examples, the sensing threshold may be obtained in response to receiving the touch input. Additionally, a global sensing threshold may be set based on the obtained sensing threshold associated with the user interface context.

Information of the touch input may be compared to the sensing threshold (206). As discussed above, information of the touch input may include proximity, size, resistance, capacitance, location, shape, and/or speed, among other possibilities. It may be determined, based on the comparison, whether to generate an input event based on the touch input (208). In some examples, an input event may only be generated if the information of the touch input exceeds the sensing threshold. For example, the sensing threshold may be a minimum touch proximity, and information of the touch input including a measure of touch proximity may be compared to the minimum touch proximity. If the measure of touch proximity exceeds the minimum touch proximity, then an input event may be generated based on the touch input.

Generating an input event based on the touch input can include generating an input event based on information of the touch input. For example, a location of the touch input may be determined with respect to a UI object (e.g., button) and an input event on that UI object may be generated (e.g., setting the button to a pushed state). In another example, a gesture of the touch input may be determined (e.g., pinch), and an input event associated with that touch input may be generated (e.g., scaling an image).

In some examples, determining whether to generate an input event can include determining whether to pass information of the touch input to one or more modules that may generate input events based on information of the touch input.

The examples discussed above can be implemented in one or more Application Programming Interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component.

The above-described features can be implemented as part of an application program interface (API) that can allow it to be incorporated into different applications (e.g., spreadsheet apps) utilizing touch input as an input mechanism. An API can allow a developer of an API-calling component (which may be a third party developer) to leverage specified features, such as those described above, provided by an API-implementing component. There may be one API-calling component or there may be more than one such component. An API can be a source code interface that a computer system or program library provides in order to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some examples, the API-implementing component may provide more than one API, each providing a different view of the functionality implemented by the API-implementing component, or with different aspects that access different aspects of the functionality implemented by the API-implementing component. For example, one API of an API-implementing component can provide a first set of functions and can be exposed to third party developers, and another API of the API-implementing component can be hidden (not exposed) and provide a subset of the first set of functions and also provide another set of functions, such as testing or debugging functions which are not in the first set of functions. In other examples the API-implementing component may itself call one or more other components via an underlying API and thus be both an API-calling component and an API-implementing component.

An API defines the language and parameters that API-calling components use when accessing and using specified features of the API-implementing component. For example, an API-calling component accesses the specified features of the API-implementing component through one or more API calls or invocations (embodied for example by function or method calls) exposed by the API and passes data and control information using parameters via the API calls or invocations. The API-implementing component may return a value through the API in response to an API call from an API-calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API-calling component) and an API-implementing component. Transferring the API calls may include issuing, initiating, invoking, calling, receiving, returning, or responding to the function calls or messages; in other words, transferring can describe actions by either of the API-calling component or the API-implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API-implementing component. Thus, the API-calling component may declare variables, use pointers to, use or instantiate constant values of such types or classes by using definitions provided in the API.

Generally, an API can be used to access a service or data provided by the API-implementing component or to initiate performance of an operation or computation provided by the API-implementing component. By way of example, the API-implementing component and the API-calling component may each be any one of an operating system, a library, a device driver, an API, an application program, or other module (it should be understood that the API-implementing component and the API-calling component may be the same or different type of module from each other). API-implementing components may in some cases be embodied at least in part in firmware, microcode, or other hardware logic. In some examples, an API may allow a client program to use the services provided by a Software Development Kit (SDK) library. In other examples an application or other client program may use an API provided by an Application Framework. In these examples the application or client program may incorporate calls to functions or methods provided by the SDK and provided by the API or use data types or objects defined in the SDK and provided by the API. An Application Framework may in these examples provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API-calling component may be a local component (i.e., on the same data processing system as the API-implementing component) or a remote component (i.e., on a different data processing system from the API-implementing component) that communicates with the API-implementing component through the API over a network. It should be understood that an API-implementing component may also act as an API-calling component (i.e., it may make API calls to an API exposed by a different API-implementing component) and an API-calling component may also act as an API-implementing component by implementing an API that is exposed to a different API-calling component.

The API may allow multiple API-calling components written in different programming languages to communicate with the API-implementing component (thus the API may include features for translating calls and returns between the API-implementing component and the API-calling component); however the API may be implemented in terms of a specific programming language. An API-calling component can, in one example, call APIs from different providers such as a set of APIs from an OS provider and another set of APIs from a plug-in provider and another set of APIs from another provider (e.g. the provider of a software library) or creator of the another set of APIs.

Figure 3:
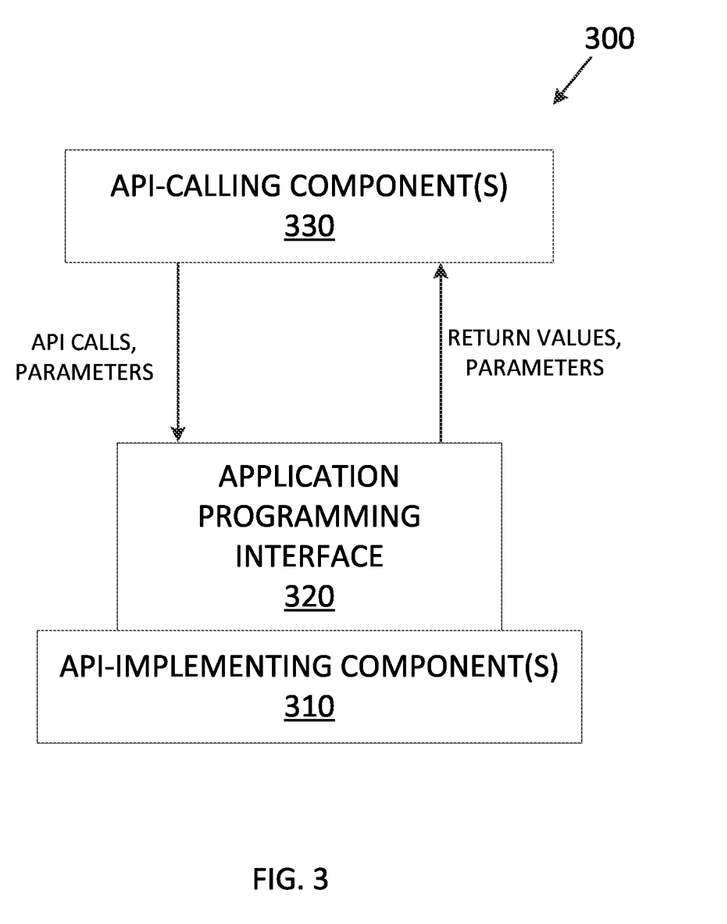
FIG. 3 is a block diagram illustrating an exemplary API architecture, which may be used in some examples of the disclosure.

FIG. 3 is a block diagram illustrating an exemplary API architecture, which may be used in some examples of the disclosure. As shown in FIG. 3, the API architecture 300 includes the API-implementing component 310 (e.g., an operating system, a library, a device driver, an API, an application program, software or other module) that implements the API 320. The API 320 specifies one or more functions, methods, classes, objects, protocols, data structures, formats and/or other features of the API-implementing component that may be used by the API-calling component 330. The API 320 can specify at least one calling convention that specifies how a function in the API-implementing component receives parameters from the API-calling component and how the function returns a result to the API-calling component. The API-calling component 330 (e.g., an operating system, a library, a device driver, an API, an application program, software or other module), makes API calls through the API 320 to access and use the features of the API-implementing component 310 that are specified by the API 320. The API-implementing component 310 may return a value through the API 320 to the API-calling component 330 in response to an API call.

It will be appreciated that the API-implementing component 310 may include additional functions, methods, classes, data structures, and/or other features that are not specified through the API 320 and are not available to the API-calling component 330. It should be understood that the API-calling component 330 may be on the same system as the API-implementing component 310 or may be located remotely and accesses the API-implementing component 310 using the API 320 over a network. While FIG. 3 illustrates a single API-calling component 330 interacting with the API 320, it should be understood that other API-calling components, which may be written in different languages (or the same language) than the API-calling component 330, may use the API 320.

The API-implementing component 310, the API 320, and the API-calling component 330 may be stored in a non-transitory machine-readable storage medium, which includes any mechanism for storing information in a form readable by a machine (e.g., a computer or other data processing system). For example, a machine-readable medium includes magnetic disks, optical disks, random access memory; read only memory, flash memory devices, etc.

Figure 4:
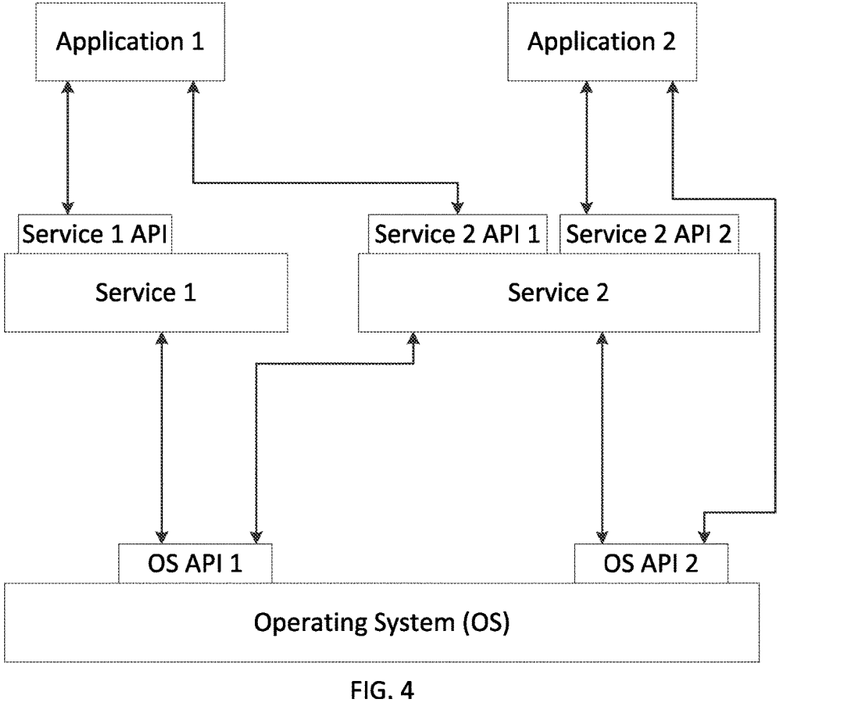
FIG. 4 illustrates an exemplary software stack of an API according to examples of the disclosure.

In the exemplary software stack shown in FIG. 4, applications can make calls to Services A or B using several Service APIs and to Operating System (OS) using several OS APIs. Services A and B can make calls to OS using several OS APIs.

Note that the Service 2 has two APIs, one of which (Service 2 API 1) receives calls from and returns values to Application 1 and the other (Service 2 API 2) receives calls from and returns values to Application 2. Service 1 (which can be, for example, a software library) makes calls to and receives returned values from OS API 1, and Service 2 (which can be, for example, a software library) makes calls to and receives returned values from both OS API 1 and OS API 2. Application 2 makes calls to and receives returned values from OS API 2.

Figure 5:
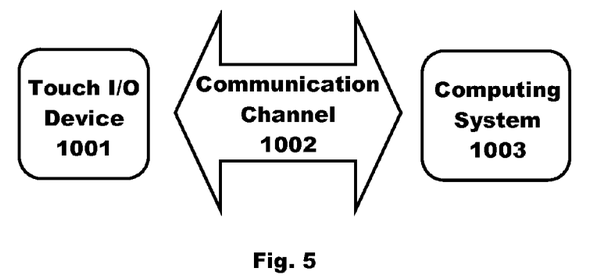
FIG. 5 is a block diagram illustrating exemplary interactions between the touch screen and the other components of the device according to examples of the disclosure.

FIG. 5 is a block diagram illustrating exemplary interactions between the touch screen and the other components of the device. Described examples may include touch I/O device 1001 that can receive touch input for interacting with computing system 1003 via wired or wireless communication channel 1002. Touch I/O device 1001 may be used to provide user input to computing system 1003 in lieu of or in combination with other input devices such as a keyboard, mouse, etc. One or more touch I/O devices 1001 may be used for providing user input to computing system 1003. Touch I/O device 1001 may be an integral part of computing system 1003 (e.g., touch screen on a smartphone or a tablet PC) or may be separate from computing system 1003.

Touch I/O device 1001 may include a touch sensing panel which is wholly or partially transparent, semitransparent, non-transparent, opaque or any combination thereof. Touch I/O device 1001 may be embodied as a touch screen, touch pad, a touch screen functioning as a touch pad (e.g., a touch screen replacing the touchpad of a laptop), a touch screen or touchpad combined or incorporated with any other input device (e.g., a touch screen or touchpad disposed on a keyboard) or any multi-dimensional object having a touch sensing surface for receiving touch input.

In one example, touch I/O device 1001 embodied as a touch screen may include a transparent and/or semitransparent touch sensing panel partially or wholly positioned over at least a portion of a display. According to this example, touch I/O device 1001 functions to display graphical data transmitted from computing system 1003 (and/or another source) and also functions to receive user input. In other examples, touch I/O device 1001 may be embodied as an integrated touch screen where touch sensing components/devices are integral with display components/devices. In still other examples a touch screen may be used as a supplemental or additional display screen for displaying supplemental or the same graphical data as a primary display and to receive touch input.

Touch I/O device 1001 may be configured to detect the location of one or more touches or near touches on device 1001 based on capacitive, resistive, optical, acoustic, inductive, mechanical, chemical measurements, or any phenomena that can be measured with respect to the occurrences of the one or more touches or near touches in proximity to device 1001. Software, hardware, firmware or any combination thereof may be used to process the measurements of the detected touches to identify and track one or more gestures. A gesture may correspond to stationary or non-stationary, single or multiple, touches or near touches on touch I/O device 1001. A gesture may be performed by moving one or more fingers or other objects in a particular manner on touch I/O device 1001 such as tapping, pressing, rocking, scrubbing, twisting, changing orientation, pressing with varying pressure and the like at essentially the same time, contiguously, or consecutively. A gesture may be characterized by, but is not limited to a pinching, sliding, swiping, rotating, flexing, dragging, or tapping motion between or with any other finger or fingers. A single gesture may be performed with one or more hands, by one or more users, or any combination thereof.

Computing system 1003 may drive a display with graphical data to display a graphical user interface (GUI). The GUI may be configured to receive touch input via touch I/O device 1001. Embodied as a touch screen, touch I/O device 1001 may display the GUI. Alternatively, the GUI may be displayed on a display separate from touch I/O device 1001. The GUI may include graphical elements displayed at particular locations within the interface. Graphical elements may include but are not limited to a variety of displayed virtual input devices including virtual scroll wheels, a virtual keyboard, virtual knobs, virtual buttons, any virtual UI, and the like. A user may perform gestures at one or more particular locations on touch I/O device 1001 which may be associated with the graphical elements of the GUI. In other examples, the user may perform gestures at one or more locations that are independent of the locations of graphical elements of the GUI. Gestures performed on touch I/O device 1001 may directly or indirectly manipulate, control, modify, move, actuate, initiate or generally affect graphical elements such as cursors, icons, media files, lists, text, all or portions of images, or the like within the GUI. For instance, in the case of a touch screen, a user may directly interact with a graphical element by performing a gesture over the graphical element on the touch screen. Alternatively, a touch pad generally provides indirect interaction. Gestures may also affect non-displayed GUI elements (e.g., causing user interfaces to appear) or may affect other actions within computing system 1003 (e.g., affect a state or mode of a GUI, application, or operating system). Gestures may or may not be performed on touch I/O device 1001 in conjunction with a displayed cursor. For instance, in the case in which gestures are performed on a touchpad, a cursor (or pointer) may be displayed on a display screen or touch screen and the cursor may be controlled via touch input on the touchpad to interact with graphical objects on the display screen. In other examples in which gestures are performed directly on a touch screen, a user may interact directly with objects on the touch screen, with or without a cursor or pointer being displayed on the touch screen.

Feedback may be provided to the user via communication channel 1002 in response to or based on the touch or near touches on touch I/O device 1001. Feedback may be transmitted optically, mechanically, electrically, olfactory, acoustically, or the like or any combination thereof and in a variable or non-variable manner.

Figure 6:
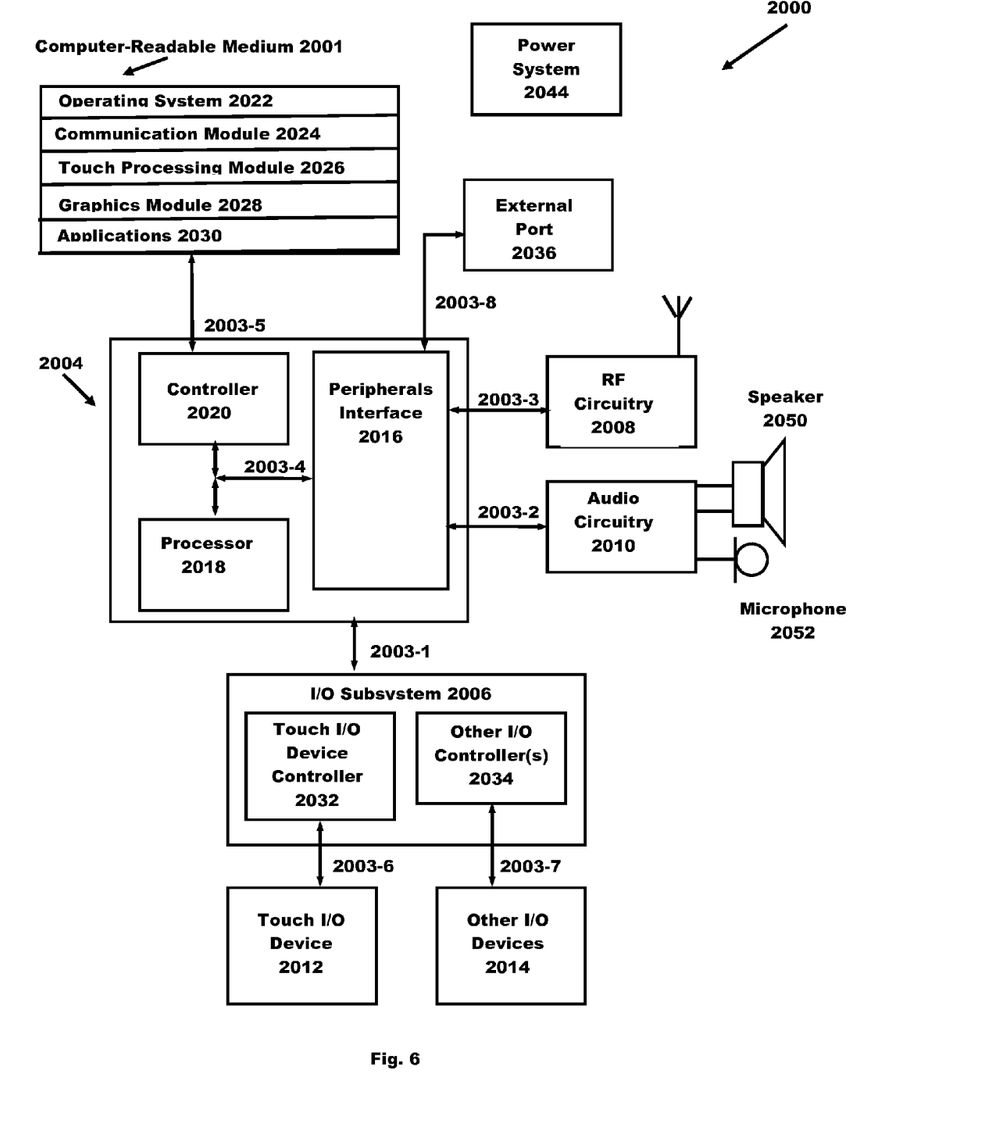
FIG. 6 is a block diagram illustrating an example of a system architecture that may be embodied within any portable or non-portable device according to examples of the disclosure.

Attention is now directed towards examples of a system architecture that may be embodied within any portable or non-portable device including but not limited to a communication device (e.g. mobile phone, smart phone), a multimedia device (e.g., MP3 player, TV, radio), a portable or handheld computer (e.g., tablet, netbook, laptop), a desktop computer, an All-In-One desktop, a peripheral device, or any other system or device adaptable to the inclusion of system architecture 2000, including combinations of two or more of these types of devices. FIG. 6 is a block diagram of one example of system 2000 that generally includes one or more computer-readable mediums 2001, processing system 2004, I/O subsystem 2006, radio frequency (RF) circuitry 2008, audio circuitry 2010, and gaze detection circuitry 2011. These components may be coupled by one or more communication buses or signal lines 2003.

It should be apparent that the architecture shown in FIG. 6 is only one example architecture of system 2000, and that system 2000 could have more or fewer components than shown, or a different configuration of components. The various components shown in FIG. 6 can be implemented in hardware, software, firmware or any combination thereof, including one or more signal processing and/or application specific integrated circuits.

RF circuitry 2008 is used to send and receive information over a wireless link or network to one or more other devices and includes well-known circuitry for performing this function. RF circuitry 2008 and audio circuitry 2010 are coupled to processing system 2004 via peripherals interface 2016. Interface 2016 includes various known components for establishing and maintaining communication between peripherals and processing system 2004. Audio circuitry 2010 is coupled to audio speaker 2050 and microphone 2052 and includes known circuitry for processing voice signals received from interface 2016 to enable a user to communicate in real-time with other users. In some examples, audio circuitry 2010 includes a headphone jack (not shown).

Peripherals interface 2016 couples the input and output peripherals of the system to processor 2018 and computer-readable medium 2001. One or more processors 2018 communicate with one or more computer-readable mediums 2001 via controller 2020. Computer-readable medium 2001 can be any device or medium that can store code and/or data for use by one or more processors 2018. Medium 2001 can include a memory hierarchy, including but not limited to cache, main memory and secondary memory. The memory hierarchy can be implemented using any combination of RAM (e.g., SRAM, DRAM, DDRAM), ROM, FLASH, magnetic and/or optical storage devices, such as disk drives, magnetic tape, CDs (compact disks) and DVDs (digital video discs). Medium 2001 may also include a transmission medium for carrying information-bearing signals indicative of computer instructions or data (with or without a carrier wave upon which the signals are modulated). For example, the transmission medium may include a communications network, including but not limited to the Internet (also referred to as the World Wide Web), intranet(s), Local Area Networks (LANs), Wide Local Area Networks (WLANs), Storage Area Networks (SANs), Metropolitan Area Networks (MAN) and the like.

One or more processors 2018 run various software components stored in medium 2001 to perform various functions for system 2000. In some examples, the software components include operating system 2022, communication module (or set of instructions) 2024, touch processing module (or set of instructions) 2026, graphics module (or set of instructions) 2028, and one or more applications (or set of instructions) 2030. Each of these modules and above noted applications correspond to a set of instructions for performing one or more functions described above and the methods described in this application (e.g., the computer-implemented methods and other information processing methods described herein). These modules (i.e., sets of instructions) need not be implemented as separate software programs, procedures or modules, and thus various subsets of these modules may be combined or otherwise re-arranged in various examples. In some examples, medium 2001 may store a subset of the modules and data structures identified above. Furthermore, medium 2001 may store additional modules and data structures not described above.

Operating system 2022 includes various procedures, sets of instructions, software components and/or drivers for controlling and managing general system tasks (e.g., memory management, storage device control, power management, etc.) and facilitates communication between various hardware and software components.

Communication module 2024 facilitates communication with other devices over one or more external ports 2036 or via RF circuitry 2008 and includes various software components for handling data received from RF circuitry 2008 and/or external port 2036.

Graphics module 2028 includes various known software components for rendering, animating and displaying graphical objects on a display surface. In examples in which touch I/O device 2012 is a touch sensing display (e.g., touch screen), graphics module 2028 includes components for rendering, displaying, and animating objects on the touch sensing display.

One or more applications 2030 can include any applications installed on system 2000, including without limitation, a browser, address book, contact list, email, instant messaging, word processing, keyboard emulation, widgets, JAVA-enabled applications, encryption, digital rights management, voice recognition, voice replication, location determination capability (such as that provided by the global positioning system (GPS)), a music player, etc.

Touch processing module 2026 includes various software components for performing various tasks associated with touch I/O device 2012 including but not limited to receiving and processing touch input received from I/O device 2012 via touch I/O device controller 2032.

I/O subsystem 2006 is coupled to touch I/O device 2012 and one or more other I/O devices 2014 for controlling or performing various functions. Touch I/O device 2012 communicates with processing system 2004 via touch I/O device controller 2032, which includes various components for processing user touch input (e.g., scanning hardware). One or more other input controllers 2034 receives/sends electrical signals from/to other I/O devices 2014. Other I/O devices 2014 may include physical buttons, dials, slider switches, sticks, keyboards, touch pads, additional display screens, or any combination thereof.

If embodied as a touch screen, touch I/O device 2012 displays visual output to the user in a GUI. The visual output may include text, graphics, video, and any combination thereof. Some or all of the visual output may correspond to user-interface objects. Touch I/O device 2012 forms a touch sensing surface that accepts touch input from the user. Touch I/O device 2012 and touch screen controller 2032 (along with any associated modules and/or sets of instructions in medium 2001) detects and tracks touches or near touches (and any movement or release of the touch) on touch I/O device 2012 and converts the detected touch input into interaction with graphical objects, such as one or more user-interface objects. In the case in which device 2012 is embodied as a touch screen, the user can directly interact with graphical objects that are displayed on the touch screen. Alternatively, in the case in which device 2012 is embodied as a touch device other than a touch screen (e.g., a touch pad), the user may indirectly interact with graphical objects that are displayed on a separate display screen embodied as I/O device 2014.

Touch I/O device 2012 may be analogous to the multi-touch sensing surface described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference.

Examples in which touch I/O device 2012 is a touch screen, the touch screen may use LCD (liquid crystal display) technology, LPD (light emitting polymer display) technology, OLED (organic LED), or OEL (organic electro luminescence), although other display technologies may be used in other examples.

Feedback may be provided by touch I/O device 2012 based on the user's touch input as well as a state or states of what is being displayed and/or of the computing system. Feedback may be transmitted optically (e.g., light signal or displayed image), mechanically (e.g., haptic feedback, touch feedback, force feedback, or the like), electrically (e.g., electrical stimulation), olfactory, acoustically (e.g., beep or the like), or the like or any combination thereof and in a variable or non-variable manner.

System 2000 also includes power system 2044 for powering the various hardware components and may include a power management system, one or more power sources, a recharging system, a power failure detection circuit, a power converter or inverter, a power status indicator and any other components typically associated with the generation, management and distribution of power in portable devices.

In some examples, peripherals interface 2016, one or more processors 2018, and memory controller 2020 may be implemented on a single chip, such as processing system 2004. In some other examples, they may be implemented on separate chips.

Examples of the disclosure can be advantageous in preventing inadvertent touch input, making use of an electronic device with a touch sensing surface more intuitive and less frustrating to operate.

In some examples, a non-transitory computer readable storage medium is disclosed. The medium can have stored therein instructions, which when executed by a device having a touch sensing surface, cause the device to perform a method as described by one or more examples herein.

In some examples, a method of a computing device including a touch sensing surface is disclosed. The method may include receiving touch input on or near the touch sensing surface; determining a user interface context; obtaining a sensing threshold associated with the user interface context; comparing information of the touch input to the sensing threshold; and determining, based on the comparison, whether to generate an input event based on the touch input. Additionally or alternatively to one or more of the examples described above, comparing information of the touch input to the sensing threshold may include comparing one of a proximity, a force, a capacitance, and a size of the touch input to the sensing threshold. Additionally or alternatively to one or more of the examples described above, the user interface context may be determined based on the touch input. Additionally or alternatively to one or more of the examples described above, determining the user interface context based on the touch input may include: determining a location of the touch input; and determining that the location is within a first region of the touch sensing surface; wherein obtaining the sensing threshold associated with the user interface context may include obtaining the sensing threshold associated with the first region. Additionally or alternatively to one or more of the examples described above, the first region may be associated with a user interface object. Additionally or alternatively to one or more of the examples described above, determining the user interface context based on the touch input may include determining a gesture of the touch input, and obtaining the sensing threshold associated with the user interface context may include obtaining the sensing threshold associated with the gesture. Additionally or alternatively to one or more of the examples described above, the user interface context may include an application, and obtaining the sensing threshold associated with the user interface context may include obtaining the sensing threshold associated with the application. Additionally or alternatively to one or more of the examples described above, the user interface context may include a page of an application, and obtaining the sensing threshold associated with the user interface context may include obtaining the sensing threshold associated with the page of the application. Additionally or alternatively to one or more of the examples described above, the user interface context may be determined before receiving the touch input. Additionally or alternatively to one or more of the examples described above, the user interface context may include a button, and determining whether to generate an input event may include determining whether to set the button to a pushed state. Additionally or alternatively to one or more of the examples described above, the method may further include setting a global sensing threshold based on the obtained sensing threshold associated with the user interface context.

In some examples, an electronic device may be disclosed. The electronic device may include a processor to execute instructions; a touch sensing surface; and a memory coupled with the processor to store instructions, which when executed by the processor, cause the processor to perform operations to generate an application programming interface (API) that allows an API-calling component to perform the following operations: receiving touch input on or near the touch sensing surface; determining a user interface context; obtaining a sensing threshold associated with the user interface context; comparing information of the touch input to the sensing threshold; and determining, based on the comparison, whether to generate an input event based on the touch input. Additionally or alternatively to one or more of the examples described above, comparing information of the touch input to the sensing threshold may include comparing one of a proximity, a force, a capacitance, and a size of the touch input to the sensing threshold. Additionally or alternatively to one or more of the examples described above, the user interface context may be determined based on the touch input. Additionally or alternatively to one or more of the examples described above, determining the user interface context based on the touch input may include: determining a location of the touch input; and determining that the location is within a first region of the touch sensing surface; wherein obtaining the sensing threshold associated with the user interface context may include obtaining the sensing threshold associated with the first region. Additionally or alternatively to one or more of the examples described above, the first region may be associated with a user interface object. Additionally or alternatively to one or more of the examples described above, determining the user interface context based on the touch input may include determining a gesture of the touch input, and obtaining the sensing threshold associated with the user interface context may include obtaining the sensing threshold associated with the gesture. Additionally or alternatively to one or more of the examples described above, the user interface context may include an application, and obtaining the sensing threshold associated with the user interface context may include obtaining the sensing threshold associated with the application. Additionally or alternatively to one or more of the examples described above, the user interface context may include a page of an application, and obtaining the sensing threshold associated with the user interface context may include obtaining the sensing threshold associated with the page of the application. Additionally or alternatively to one or more of the examples described above, the user interface context may be determined before receiving the touch input. Additionally or alternatively to one or more of the examples described above, the user interface context may include a button, and determining whether to generate an input event may include determining whether to set the button to a pushed state. Additionally or alternatively to one or more of the examples described above, the operations may further include setting a global sensing threshold based on the obtained sensing threshold associated with the user interface context.

Although the disclosed examples have been fully described with reference to the accompanying drawings, it is to be noted that various changes and modifications will become apparent to those skilled in the art. Such changes and modifications are to be understood as being included within the scope of the disclosed examples as defined by the appended claims.

What is claimed is:

1. A method of a computing device including a touch sensing surface, the method comprising:
   receiving a first touch input corresponding to a first user interface context and a second touch input corresponding to a second user interface context on or near the touch sensing surface;
   determining an active application in a user interface;
   in accordance with a determination that a first application is active in the user interface:
      obtaining a first sensing threshold associated with the first application;
      comparing information of the first touch input corresponding to the first user interface context to the first sensing threshold;
      comparing information of the second touch input corresponding to the second user interface context to the first sensing threshold;
      determining, based on the comparison of the first touch input to the first sensing threshold, whether to generate a first input event based on the first touch input; and
      determining, based on the comparison of the second touch input to the first sensing threshold, whether to generate the second input event based on the second touch input; and
   in accordance with a determination that a second application is active in the user interface:
      obtaining a second sensing threshold associated with the second application, different from the first sensing threshold;
      comparing information of the first touch input corresponding to the first user interface context to the second sensing threshold;
      comparing information of the second touch input corresponding to the second user interface context to the first sensing threshold;
      determining, based on the comparison of the first touch input to the second sensing threshold, whether to generate the first input event based on the first touch input; and
      determining, based on the comparison of the second touch input to the first sensing threshold, whether to generate the second input event based on the second touch input;
   wherein determining whether to generate the input event includes determining whether to register a touch.

2. The method of claim 1, wherein comparing information of the first touch input to the first or second sensing threshold includes comparing one of a proximity, a force, a capacitance, and a size of the touch input to the first or second sensing threshold.

3. The method of claim 1, wherein obtaining the first sensing threshold associated with the first application includes:
   determining a location of the first touch input;
   determining a user interface object associated with the location of the first touch input;
   in accordance with a determination that the user interface object is a first user interface object associated with a first region of the touch sensing surface, obtaining a first value for the first sensing threshold associated with the first region; and in accordance with a determination that the user interface object is a second user interface object associated with the sensing threshold, obtaining the a second value for the first sensing threshold, different from the first value, associated with the second user interface object.

4. The method of claim 1, wherein obtaining the first sensing threshold associated with the first application includes:
   determining a location of the first touch input; and
   determining that the location is within a first region of the touch sensing surface;
   wherein obtaining the first sensing threshold associated with the first application includes obtaining a sensing threshold associated with the first region.

5. The method of claim 4, wherein the first region is associated with a user interface object.

6. The method of claim 1, wherein obtaining the first sensing threshold associated with the first application includes determining a gesture of the touch input, and obtaining a sensing threshold associated with the gesture.

7. The method of claim 1, wherein obtaining the first sensing threshold associated with the first application includes obtaining a sensing threshold associated with a page of the first application.

8. The method of claim 1, wherein the first sensing threshold is determined before receiving the first touch input.

9. The method of claim 1, wherein the first application includes a button, and determining whether to generate an input event includes determining whether to set the button to a pushed state.

10. The method of claim 1, further comprising:
    setting a global sensing threshold based on the obtained sensing threshold associated with the first or second application.

11. The method of claim 1, wherein the user interface context is a panel, button, graphic, or icon.

12. The method of claim 1, wherein the user interface context is a gesture.

13. An electronic device, comprising:
    a processor to execute instructions;
    a touch sensing surface; and
    a memory coupled with the processor to store instructions, which when executed by the processor, cause the processor to perform operations to generate an application programming interface (API) that allows an API-calling component to perform the following operations:
    receiving a first touch input corresponding to a first user interface context and a second touch input corresponding to a second user interface context on or near the touch sensing surface;
    determining an active application in the user interface;
    in accordance with a determination that a first application is active in the user interface:
      obtaining a first sensing threshold associated with the first application;
      comparing information of the first touch input corresponding to the first user interface context to the first sensing threshold;
      comparing information of the second touch input corresponding to the second user interface context to the first sensing threshold;
      determining, based on the comparison of the first touch input to the first sensing threshold, whether to generate a first input event based on the first touch input; and
      determining, based on the comparison of the second touch input to the first sensing threshold, whether to generate the second input event based on the second touch input; and
    in accordance with a determination that a second application is active in the user interface:
      obtaining a second sensing threshold associated with the second application, different from the first sensing threshold;
      comparing information of the first touch input corresponding to the user interface context to the second sensing threshold; comparing information of the second touch input corresponding to the second user interface context to the first sensing threshold;
      determining, based on the comparison of the first touch input to the second sensing threshold, whether to generate the first input event based on the first touch input; and
      determining, based on the comparison of the second touch input to the first sensing threshold, whether to generate the second input event based on the second touch input;
    wherein determining whether to generate the input event includes determining whether to register a touch.

14. The electronic device of claim 13, wherein comparing information of the first touch input to the first or second sensing threshold includes comparing one of a proximity, a force, a capacitance, and a size of the touch input to the first or second sensing threshold.

15. The electronic device of claim 13, wherein obtaining the first sensing threshold associated with the first application includes:
    determining a location of the first touch input;
    determining a user interface object associated with the location of the touch input;
    in accordance with a determination that the user interface object is a first user interface object associated with a first region of the touch sensing surface, obtaining a first value for the first sensing threshold associated with the first region; and
    in accordance with a determination that the user interface object is a second user interface object associated with the sensing threshold, obtaining the a second value for the first sensing threshold, different from the first value, associated with the second user interface object.

16. The electronic device of claim 13, wherein obtaining the first sensing threshold associated with the first application includes:
    determining a location of the first touch input; and
    determining that the location is within a first region of the touch sensing surface;
    wherein obtaining the first sensing threshold associated with the first application includes obtaining a sensing threshold associated with the first region.

17. The electronic device of claim 16, wherein the first region is associated with a user interface object.

18. The electronic device of claim 13, wherein obtaining the first sensing threshold associated with the first application includes determining a gesture of the touch input, and obtaining a sensing threshold associated with the gesture.

19. The electronic device of claim 13, wherein obtaining a sensing threshold associated with the first application includes obtaining the sensing threshold associated with a page of the first application.

20. The electronic device of claim 13, wherein the first sensing threshold is determined before receiving the first touch input.

21. The electronic device of claim 13, wherein the first application includes a button, and determining whether to generate an input event includes determining whether to set the button to a pushed state.

22. The electronic device of claim 13, further comprising:
setting a global sensing threshold based on the obtained sensing threshold associated with the first or second application.

23. A non-transitory computer readable storage medium storing instructions to perform a method of a computing device including a touch sensing surface, the method comprising:
receiving a first touch input corresponding to a first user interface context and a second touch input corresponding to a second user interface context on or near the touch sensing surface;
determining an active application in a user interface;
in accordance with a determination that a first application is active in the user interface:
obtaining a first sensing threshold associated with the first application;
comparing information of the first touch input corresponding to the first user interface context to the first sensing threshold;
comparing information of the second touch input corresponding to the second user interface context to the first sensing threshold;
determining, based on the comparison of the first touch input to the first sensing threshold, whether to generate a first input event based on the first touch input; and
determining, based on the comparison of the second touch input to the first sensing threshold, whether to generate the second input event based on the second touch input; and
in accordance with a determination that a second application is active in the user interface:
obtaining a second sensing threshold associated with the second application, different from the first sensing threshold;
comparing information of the first touch input corresponding to the first user interface context to the second sensing threshold;
comparing information of the second touch input corresponding to the second user interface context to the first sensing threshold;
determining, based on the comparison of the first touch input to the second sensing threshold, whether to generate the first input event based on the first touch input; and
determining, based on the comparison of the second touch input to the first sensing threshold, whether to generate the second input event based on the second touch input;
wherein determining whether to generate the input event includes determining whether to register a touch.

* * * * *